US012668108B2

(12) United States Patent
Rossi

(10) Patent No.: US 12,668,108 B2
(45) Date of Patent: Jun. 30, 2026

(54) TONNEAU COVER PIVOT PLATE

(71) Applicant: WORKSPORT LTD., Richmond Hill (CA)

(72) Inventor: Steven Rossi, Vaughan (CA)

(73) Assignee: Worksport Ltd., Richmond Hill (CA)

( * ) Notice: Subject to any disclaimer, the term of this patent is extended or adjusted under 35 U.S.C. 154(b) by 322 days.

(21) Appl. No.: 18/410,438

(22) Filed: Jan. 11, 2024

(65) Prior Publication Data

US 2024/0239165 A1 Jul. 18, 2024

Related U.S. Application Data

(60) Provisional application No. 63/438,886, filed on Jan. 13, 2023.

(51) Int. Cl.
B60J 7/14 (2006.01)
E05D 3/02 (2006.01)

(52) U.S. Cl.
CPC .............. B60J 7/141 (2013.01); E05D 3/022 (2013.01); *E05Y 2900/53* (2013.01)

(58) Field of Classification Search
CPC ................................ B60J 7/141; B60J 7/1621
See application file for complete search history.

(56) References Cited

U.S. PATENT DOCUMENTS

| | | | | |
|---|---|---|---|---|
| 3,762,762 A | | 10/1973 | Beveridge et al. | |
| 3,833,255 A | * | 9/1974 | Logue ...................... | B60J 7/041 |
| | | | | 296/101 |

| | | | | |
|---|---|---|---|---|
| 5,427,428 A | * | 6/1995 | Ericson .................... | B60J 7/141 |
| | | | | 296/100.09 |
| 5,971,446 A | * | 10/1999 | Lunney, II ............. | B60J 7/1621 |
| | | | | 296/100.1 |
| 7,537,264 B2 | * | 5/2009 | Maimin .................... | B60P 7/02 |
| | | | | 296/100.09 |
| 9,211,834 B2 | * | 12/2015 | Facchinello .............. | B60P 7/02 |
| 10,112,466 B2 | * | 10/2018 | Facchinello ............. | B60J 7/196 |
| 10,399,420 B2 | | 9/2019 | Rossi | |

(Continued)

FOREIGN PATENT DOCUMENTS

| | | | | |
|---|---|---|---|---|
| AU | 2007100565 A4 | * | 8/2007 | |
| CN | 204749979 U | * | 11/2015 | .............. B60J 7/141 |

(Continued)

*Primary Examiner* — Paul N Dickson
(74) *Attorney, Agent, or Firm* — Bond, Schoeneck & King, PLLC

(57) ABSTRACT

A pivot plate system that mounts between a tonneau cover and a bed of a pickup truck and enables pivoting of the tonneau cover between substantially horizontal and vertical orientations. The pivot plate system includes first and second pivot plates configured to mount to/on first and second sidewalls of the pickup truck. Each of the first and second pivot plates includes a fixed member configured to mount to/on one of the sidewalls and a moveable plate configured for releasable mounting of a forward section of the tonneau cover thereto. The moveable plate is pivotally connected to the fixed plate at a forward part thereof and is moveable relative to the fixed plate about an axis between the substantially horizontal vertical orientations, such that the tonneau cover is moveable with the moveable plate from the substantially horizontal orientation to the substantially vertical orientation.

15 Claims, 9 Drawing Sheets

(56) References Cited

U.S. PATENT DOCUMENTS

| | | | | |
|---|---|---|---|---|
| 10,525,803 B2 * | 1/2020 | Hutchens, III | .......... | B32B 15/10 |
| 10,596,887 B2 | 3/2020 | Rossi et al. | | |
| 11,299,021 B2 * | 4/2022 | Dylewski, II | ........... | B60J 7/198 |
| 2007/0096499 A1 | 5/2007 | Zajicek et al. | | |
| 2014/0152046 A1 * | 6/2014 | Facchinello | ............ | B60J 7/141 |
| | | | | 296/100.06 |
| 2017/0291478 A1 * | 10/2017 | Hall | ......................... | B60J 7/141 |
| 2018/0201106 A1 | 7/2018 | Facchinello | | |

FOREIGN PATENT DOCUMENTS

| | | | | | |
|---|---|---|---|---|---|
| CN | 110525179 B | * | 6/2024 | .............. | B60J 7/141 |
| CN | 119348389 A | * | 1/2025 | .............. | B60J 7/141 |
| WO | WO-2024137971 A1 | * | 6/2024 | .............. | B60J 7/198 |

* cited by examiner

TONNEAU COVER PIVOT PLATE

CROSS REFERENCE TO RELATED APPLICATION

This application is a non-provisional patent application, which claims the benefit of provisional patent application No. 63/438,886, filed Jan. 13, 2023, the entire contents of which are herein incorporated by reference.

BACKGROUND

1. Field of the Invention

The present invention generally relates to tonneau covers used in covering the cargo boxes of pickup trucks. More particular, the present invention relates to tonneau covers and the mounting brackets used in connection therewith.

2. Description of Related Technology

An advantage of a pickup truck (hereafter just "truck") is the ability to haul or store cargo in the cargo box or bed (hereafter just "bed") of the truck. The bed is located rearward of the passenger cabin or cab (hereafter just "cab") and includes a pair of opposed sidewalls joined at their forward and rearward ends by a front wall or bulkhead and rear wall or tailgate, respectively. One truck accessory that exists to cover the bed of the truck is commonly referred to as a tonneau cover. A tonneau cover may be used to cover the bed for aesthetics and aerodynamics, and also used to protect any contents located in the bed from environmental factors, such as rain, dirt, snow and debris, or ejection from the bed.

While various styles of tonneau covers exist, one of the most popular styles is a foldable tonneau cover. A foldable tonneau cover is desirable because, when not required to cover the bed of the pickup truck, the tonneau cover may be folded toward the rear of the cab leaving a portion of the bed open and uncovered. Foldable tonneau covers themselves come in soft fold tonneau covers and hard fold tonneau covers.

A soft fold tonneau covers employ a foldable frame typically having two or more adjacent sections, each of which is defined by side frame members and transverse frame members extending transversely between the side frame members. The adjacent sections of the frame are connected by hinge mechanisms, and the sections are folded one atop another, beginning at the tailgate and proceeding toward the cab. A cover or tarp of a flexible material is retained over the entire foldable frame.

When soft fold tonneau covers are being folded, the rearmost section of the tonneau cover, the section adjacent to the tailgate, is folded forward, toward the cab, thereby locating it on top of the next rearmost section. These two sections are then together folded forward onto the next rear most section of the tonneau cover. This folding procedure is continued until all of the sections form collectively for a stack of tonneau cover sections located adjacent to the cab of the truck. In this stack, the section of the tonneau cover located closest to the cab ultimately forms the bottom of the stack. A representative construction of a soft fold tonneau cover is disclosed in U.S. Pat. No. 10,399,420.

Hard fold tonneau covers include two of more rigid panel sections, connected by hinge mechanisms, that can be folded one atop one another, proceeding from the tailgate toward the cab, generally as described in connection with soft fold tonneau covers. A representative construction of a hard fold tonneau cover is disclosed in U.S. Pat. No. 10,596,887.

When folded into a stack, a majority of the bed is uncovered and may be readily accessed. However, a portion of the bed, adjacent to the cab, is not uncovered and is not readily accessible. The uncovered portion of the bed may be about 20% or more of the length of bed. Some foldable tonneau covers permit the stack to be further rotated into a substantially upright or vertical position adjacent to the cab. This is achieved through use of a dead panel, which is fixed to the bed adjacent to the cab, and a hinged connection between the dead panel and the stack. However, a majority of foldable tonneau covers are not capable of this additional movement; accordingly, a means by which these foldable tonneau covers can be folded into a substantially upright or vertical position does not exist and is desirable.

SUMMARY

In an embodiment, the current invention is a pivot plate system that mounts between a tonneau cover and a bed of a pickup truck and enables pivoting of the tonneau cover from a substantially horizontal orientation to a substantially vertical orientation. The system comprises first and second pivot plates configured to mount to or on first and second sidewalls of the pickup truck, respectively. Each pivot plate comprises a fixed member mounted to or on the sidewalls and a moveable plate releasably mounted to a forward section of the tonneau cover. The moveable plate is pivotally connected to the fixed plate at a forward part thereof and is moveable relative to the fixed plate about an axis between the substantially horizontal orientation and the substantially vertical orientation, such that the tonneau cover is moveable with the moveable plate from the substantially horizontal orientation to the substantially vertical orientation adjacent to a cab of the pickup truck.

In an alternative embodiment, the pivot plate system comprises a U-shaped pivot plate disposed both on at least a portion of sidewalls of the pickup truck and on at least a portion of a bulkhead of the pickup truck. The pivot plate comprises a fixed member mounted on the sidewalls and bulkhead and a moveable plate releasably mounted to a forward section of the tonneau cover. The moveable plate is pivotally connected to the fixed plate at a forward part thereof and is moveable relative to the fixed plate about an axis between the substantially horizontal orientation and the substantially vertical orientation, such that the tonneau cover is moveable with the moveable plate from the substantially horizontal orientation to the substantially vertical orientation adjacent to a cab of the pickup truck.

In an alternative embodiment, the pivot plate system comprises first and second pivot plates configured to mount to or on the bulkhead of the pickup truck. Each pivot plate comprises a fixed member mounted to or on the bulkhead and a moveable plate releasably mounted to a forward section of the tonneau cover. The moveable plate is pivotally connected to the fixed plate at a rear part thereof (when folded) and is moveable relative to the fixed plate about an axis between the substantially horizontal orientation and the substantially vertical orientation, such that the tonneau cover is moveable with the moveable plate from the substantially horizontal orientation to the substantially vertical orientation adjacent to a cab of the pickup truck. In such a configuration, in the substantially vertical orientation, the tonneau cover may be supported by the fixed member. In certain embodiments, the pivot plates can have a retracted position, where a hinge between the fixed member and moveable plate is positioned adjacent to the cab of the pickup truck, and an advanced position, where the hinge and movable plate are rearwardly slidable relative to the fixed member.

Optionally, the pivot plate system may further comprise a dead panel extending between the sidewalls and mounted on the bed of the truck forward of the pivot plates.

DETAILED DESCRIPTION

As used in the description that follows, directional terms such as "upper" and "lower" are used with reference to the orientation of the elements as presented in the figures or with reference to a pickup truck. Accordingly, "upper" indicates a direction toward the top of the figure or truck and "lower" indicates a direction toward the bottom of the figure or truck. The terms "left," "right," "rearward," and "forward" are similarly interpreted. The terms "inward" or "inner" and "outward" or "outer" indicate a direction that is generally toward or away from a central axis of the referred to part whether or not such an axis is designated in the figures. An axial surface is therefore one that faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
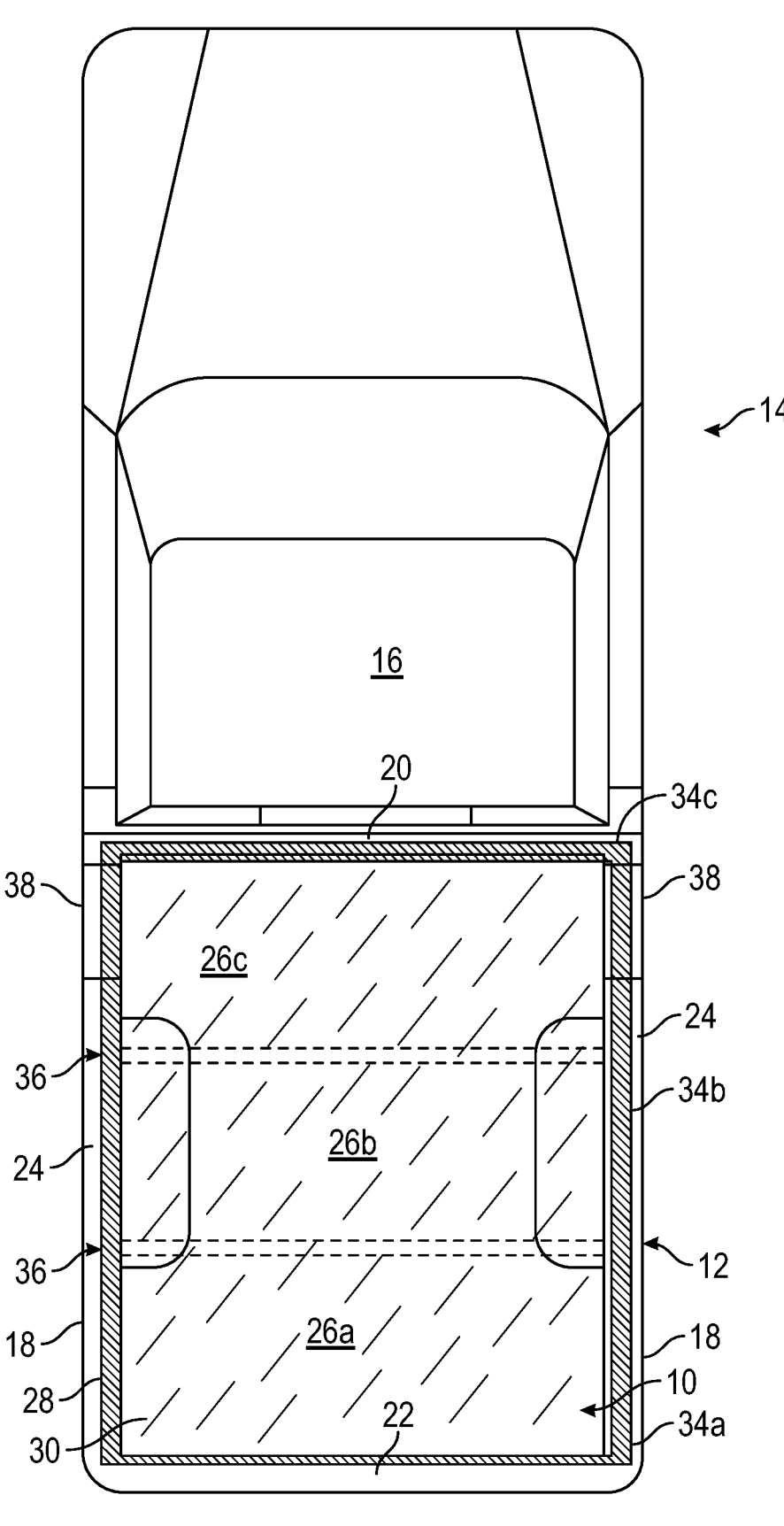
FIG. 1 is a plan view of a pickup truck with a foldable tonneau cover in an unfolded position covering the bed of the truck.

Referring now to the drawings, a foldable tonneau cover 10 is shown attached to the bed 12 of a pickup truck 14 in FIG. 1. The tonneau cover 10 is shown in its extended or unfolded position, in which the tonneau cover 10 covers and encloses the bed 12.

The bed 12 is located rearward of the passenger cabin or cab (hereafter "cab") 16 of the truck 14 and includes a pair of laterally opposed sidewalls 18 joined at their forward and reward ends by a front wall or bulkhead 20 and rear wall or tailgate 22, respectively. The tops of the sidewalls 18 are generally flat and define what are herein referred to as bed rails 24.

As will be discussed in detail below, the tonneau cover 10 is mounted to a pivot plate 38, secured to the bed 12, that allows the tonneau cover 10, when in a folded condition, to pivot between a horizontal orientation and a substantially upright or vertical orientation. In the horizontal orientation, the folded tonneau cover, also referred to herein as a stack, generally extends parallel to a plane defined by the top of the bed rails 24 of the bed 12. In the substantially upright or vertical orientation, the stack extends normal to the plane defined by the bed rails. The substantially upright or vertical orientation is an orientation that is rotated upward 90 degrees (+/−15 degrees) or greater from a normal to the plane, but is not greater than 45 degrees from the normal.

As previously mentioned, foldable tonneau covers come in different styles, i.e., soft and hard fold tonneau covers. As described herein, the invention is not limited to a specific style of foldable tonneau cover. Accordingly, as described below, a reference to tonneau cover 10 is a reference to all types of foldable tonneau covers, unless the language or context of the description specifically requires a different interpretation or the description otherwise indicates to the contrary.

As illustrated in FIG. 1, the tonneau cover 10 is mounted to the bed 12 of the truck 14 and includes a plurality of sections. As illustrated therein, the tonneau cover 10 has three sections, designated as sections 26a, 26b and 26c, and collectively as sections 26. Section 26a is located closest or adjacent to the tailgate 22; section 26c is located closest or adjacent to the bulkhead 20; and section 26b is located between sections 26a and 26c. It will be appreciated that the tonneau cover 10 could have more or less than three sections 26.

In the soft fold variety, the tonneau cover 10 includes a frame 28 over which a cover 30, made of a flexible material such as polyester backed vinyl, is provided. The frame 28 defines the sections 26, which are hingedly connected to one another. In a hard fold variety, the sections 26 are rigid panel-like sections, which may be of a variety of constructions, that are hingedly connected to one another.

As noted above, the sections 26 (whether in soft or hard fold variety) are generally mounted to one another by hinges 36 so as to be rotatable relative to one another. As such, the hinges 36 are positioned between the sections 26 of the tonneau cover 10. As will be appreciated by those skilled in tonneau cover construction, different configurations of the hinges 36 are well known and may vary depending on the particular construction of the tonneau cover 10 and its sections 26. Accordingly, the hinges 36 need not be described in further detail herein.

As shown in FIG. 1, the tonneau cover 10 is in its unfolded position. In the unfolded position, the sections 26 are generally coplanar with one another and the tonneau cover 10 fully extends over and covers the bed 12 of the truck 14.

In folding the tonneau cover 10 from its unfolded position into its folded position, where the sections 26 define a stack 32, the rear section 26a is first folded on top of the immediately adjacent intermediate section 26b. Next, these two sections 26a, 26b are together folded on top of the forward section 26c, which is located adjacent to the bulkhead 20 or cab 16. In this stack 32, the forward section 26c forms the bottom of the stack 32, the intermediate section 26b forms the top of the stack 32, and the rear section 26a is in the middle of the stack 32 between the forward section 26*c* and the intermediate section 26*b*. In the form of the stack 32, the tonneau cover 10 still covers a portion, albeit a reduced portion, of the bed 12.

Figure 2:
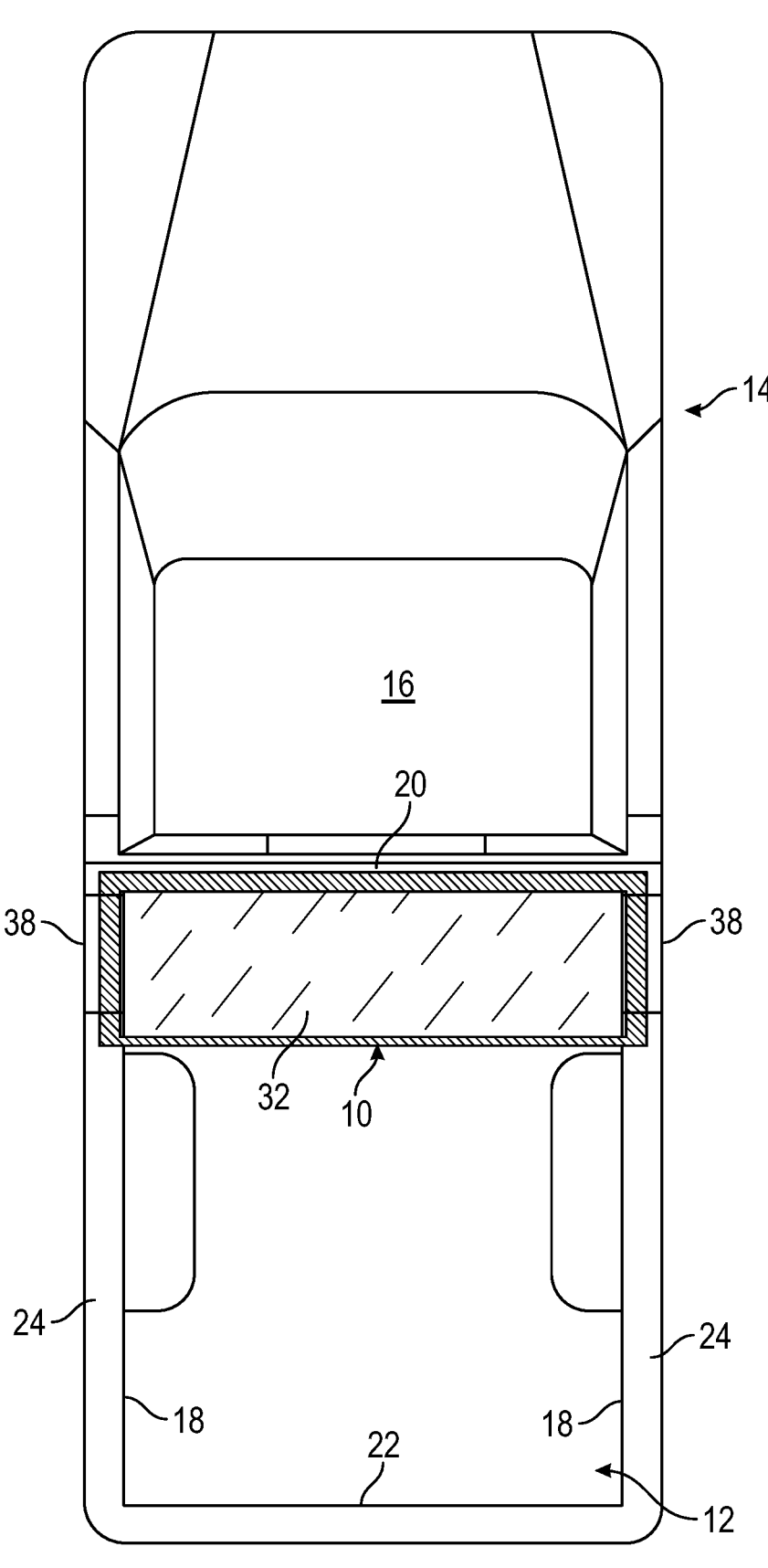
FIG. 2 is a plan view, similar to FIG. 1, showing the tonneau cover in a folded position covering a portion of the bed.

As illustrated in FIGS. 1 and 2, the frame 28 of the foldable tonneau cover 10 is positioned on the bed 12 of the pickup truck 14 such that the sections 26 rest on top of the bed rails 24 (or railings (not shown) that are installed, depending on the model of pickup truck 14), the bulkhead 20 and the tailgate 22. The stack 32 particularly rests on a forward portion of the bed rails 24, toward the bulkhead 20 and near the cab 16 of the truck 14. The covered portion of the bed 12 may constitute one quarter or more of the area of the bed 12. At times, the user of the truck 14 may find it convenient to also have this portion of the bed 12 also uncovered, but without having to completely remove the tonneau cover 10 from the truck 14.

To achieve the above, a pivot plate 38 is provided. The pivot plate 38 is mounted to the bed 12 of the truck 14 and, as discussed below, enables the tonneau cover 10, when folded into the stack 32, to pivot relative to the bed 12 so as to uncover the remainder of the bed 12. For example, the pivot plate 38 can allow the stack 32 to pivot relative to the bed from a horizontal orientation (depicted in FIGS. 2, 7A, and 7B) to a substantially upright or vertical orientation (depicted in FIGS. 4 and 7C), where the stack 32 is adjacent the rear of the cab 16 and the bed 12 is substantially fully uncovered.

The pivot plate 38 is configured receive and be mounted to a variety of foldable tonneau covers 10. Thus, the pivot plate 38 can mount to a tonneau cover 10 that, without the pivot plate 38, would otherwise be unable to facilitate rotation of its stack 32 beyond a horizontal orientation, such as to a substantially upright or vertical orientation adjacent to the cab 16.

Figure 3:
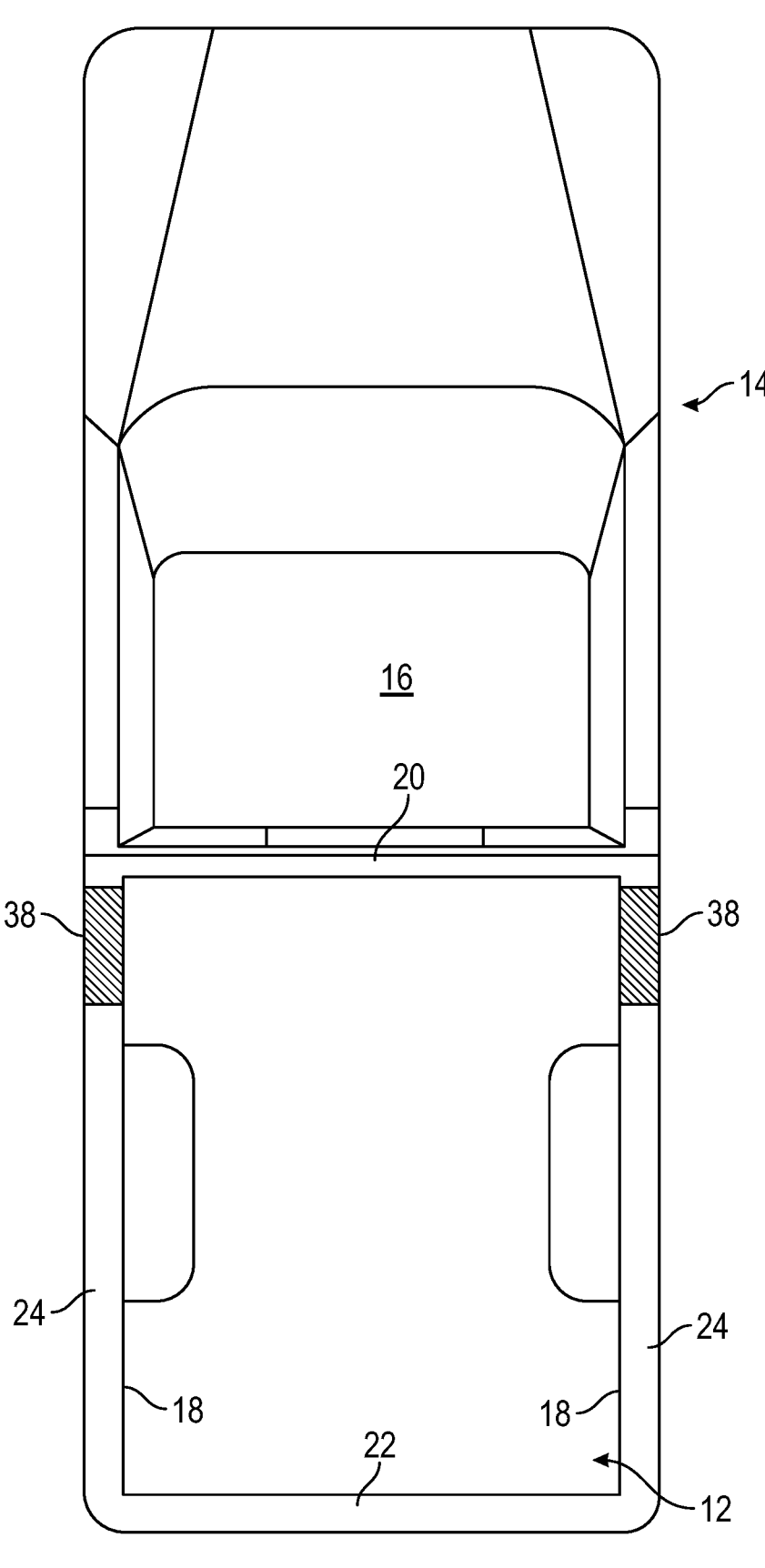
FIG. 3 is a plan view, similar to FIG. 1, but with the tonneau cover removed, showing pivot plates disposed on the side rails of the bed of the truck according to one embodiment of the present invention.

As seen in FIG. 3, a pair of pivot plates 38 are disposed on the bed rails 24 at laterally opposing positions of the bed 12 and substantially adjacent to the cab 16. The pivot plates 38 are retained on the bed rails 24 in any suitable manner. For example, the pivot plate 38 may be mounted to the bed rails 24, or to the bulkhead 20, by clamps, bolts or other mechanical fastening means. In some implementations, the pivot plate 38 may be embedded or integrally formed with the bed rails 24 and/or the bulkhead 20. Each pivot plate 38 configured to have mounted thereto the forward section 26*c* of the tonneau cover 10. The top of pivot plates 38 are of a low height and only positioned slightly above the top surface of the bed rails 24 so that, when a tonneau cover 10 is mounted to the pivot plates 38, the tonneau cover 10 remains substantially in the horizontal orientation, as described above.

Figure 4:
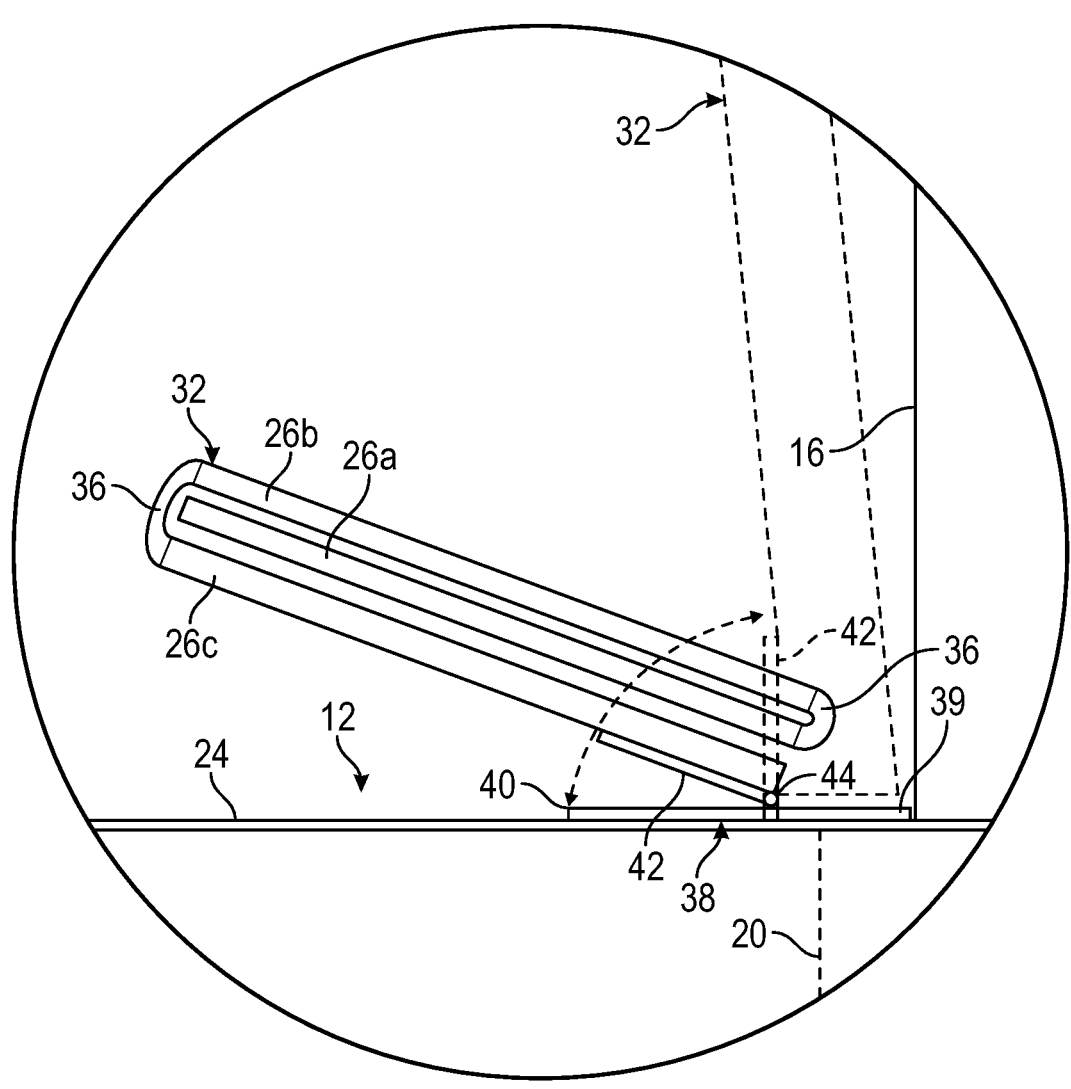
FIG. 4 is an enlarged side view of the pivot plates seen in FIG. 4.

As illustrated in FIG. 4, in one embodiment, the pivot plate 38 includes both a fixed plate 40 and a moveable plate 42. The fixed plate 40 is configured to be rigidly mounted to the bed rails 24, while the moveable plate 42 is configured to mounted to the tonneau cover 10 and rotate relative to the fixed plate 40. Although shown as being mounting on the bed rails 24 of the bed 12, the fixed plate 40, and the pivot plate 38 as a whole, can alternatively be configured to mount or be positioned slightly inwardly of the bed rails 24 and bulkhead 20, or to be integrally formed with a portion of the bed 12, such as mentioned above.

Further as mentioned above, the forward section 26*c* of the tonneau cover 10 is to be mounted to the pivot plate 42. The forward section 26*c* may be clamped, bolted or otherwise mechanically fastened to the moveable plate 42. As a result, the stack 32 may be rotated relative to the fixed plate 40 and the bed 12. This rotation is facilitated by a hinge 44 formed by or between the moveable plate 42 and the fixed plate 40.

As shown by the phantom lines in FIG. 4, the moveable plate 42 is moveable relative to the fixed plate 40 to rotate the stack 32 between a horizontal orientation and a substantially upright or vertical orientation, where the stack 32 is substantially adjacent to the cab 16 and the bed 12 is substantially uncovered. To achieve the above, the pivot plate 38 is generally spaced from the cab 16 along the bed rails 24 at a distance corresponding to and accommodating the height of the stack 32. In this position, the pivot plate 38 is still considered to be substantially adjacent to the cab 16. Optionally, the space between the pivot plate 38 and cab 16 may be filled by a dead panel 39, extending between the side rails 24 and mounted to the bed 12 so as to cover any uncovered portion of the bed 12 between the pivot plate 38 and the bulkhead 20, resulting from any repositioning of the tonneau cover 10 by the pivot plates 38.

The pivot plate 38 may further include a support member (not shown) that connects between the moveable plate 42 and the fixed plate 40, or another fixed portion of the bed 12. The support structure provides a securement feature, whereby, when the stack 32 is moved to the substantially upright or vertical orientation, the stack 32 is secured and maintained in that position. The support structure may be any one of a number of different mechanisms, including, for example, a lockable prop rod or a releasable ratchet mechanism. In some implementations, the support structure may assist in rotating the stack 32 from the horizontal orientation to the substantially upright or vertical orientation. For example, the support structure may be a spring, hydraulic, or pneumatic piston/cylinder, or it may be a mechanical linkage optionally driven by a motor in response to a user input. In some implementations, the support structure may prevent or preclude the stack 32 from unwanted pivoting back to the horizontal orientation and/or from pivoting beyond a desired point. The pivot plate 38 can permit the stack 32 to lock or stabilize in the substantially upright or vertical orientation.

Figure 5:
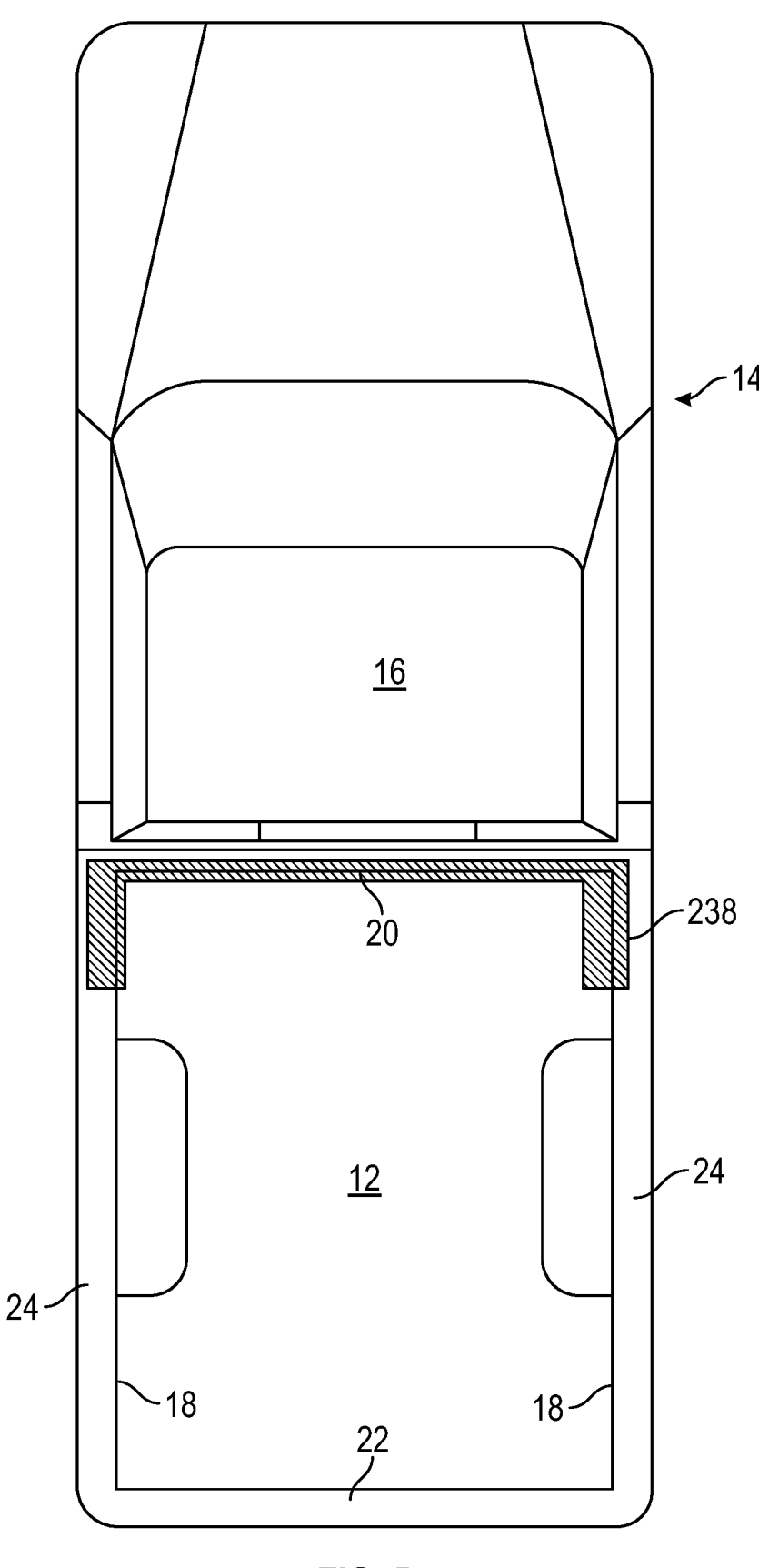
FIG. 5 is a plan view of a pivot plate according to another embodiment of the present invention.

As illustrated in FIG. 5, another embodiment of a pivot plate 238 is positioned on the bed 12 adjacent to the cab 16 of the truck 14 and configured to receive a tonneau cover 10 and rotate the stack 32 of the tonneau cover 10 relative to the bed 12. The pivot plate 238 is U-shaped and configured to enable it to be disposed on at least a portion of bed rails 24 and at least a portion of the bulkhead 20. Thus, the pivot plate 238 receives both side portions and front portion of a sub-frame 34*c* (shown in FIG. 1) of the front section 26*c* of the tonneau cover 10. Mounting the tonneau cover 10 to the pivot plate 238 disposed on the bed rails 24 and the bulkhead 20 can provide a more stable and secure attachment, which aids in preventing twisting of the stack 32 as it is raised into the substantially upright or vertical orientation. Such twisting may occur when one person on one side of the truck 14 raises the stack 32. The pivot plate 238 is configured to mount to the tonneau cover 10 and rotate between the horizontal orientation and the substantially upright or vertical orientation in a manner similar to the other embodiments discussed herein, with fixed and moveable plates connected by a hinge mechanism. Accordingly, further detailed discussion thereof is omitted in the interest of brevity.

Figure 6:
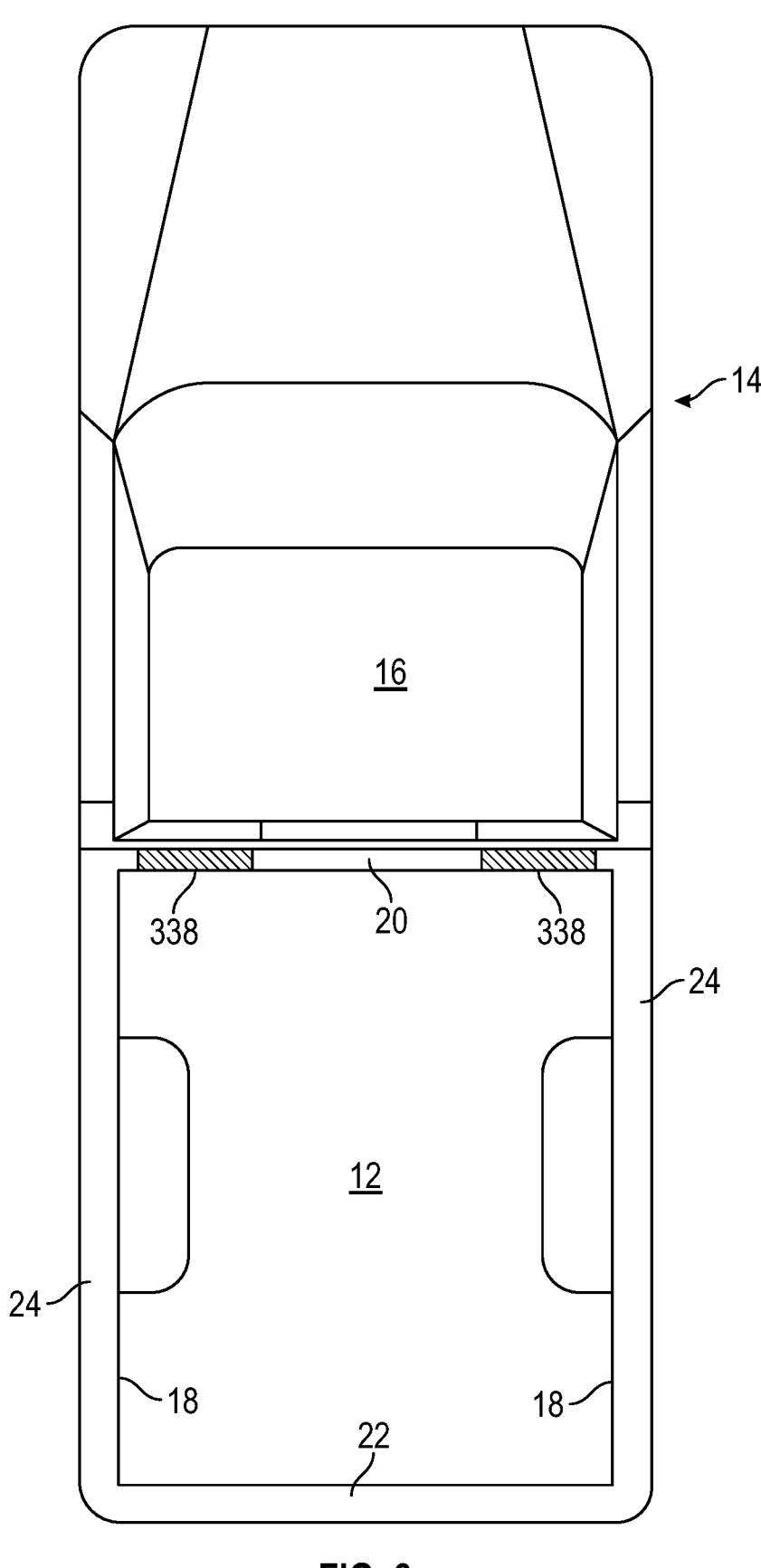
FIG. 6 is a plan view of a pivot plate according to another embodiment of the present invention.

In another embodiment, illustrated in FIG. 6, a pair of spaced apart pivot plates 338 are positioned only on at least a portion of the bulkhead 20, adjacent to the cab 16 of the truck 14. While illustrated as two separate pivot plates 338, it will be understood that a single pivot plate 338, extending along any length of the bulkhead 20, could be provided as well.

Figure 7A:
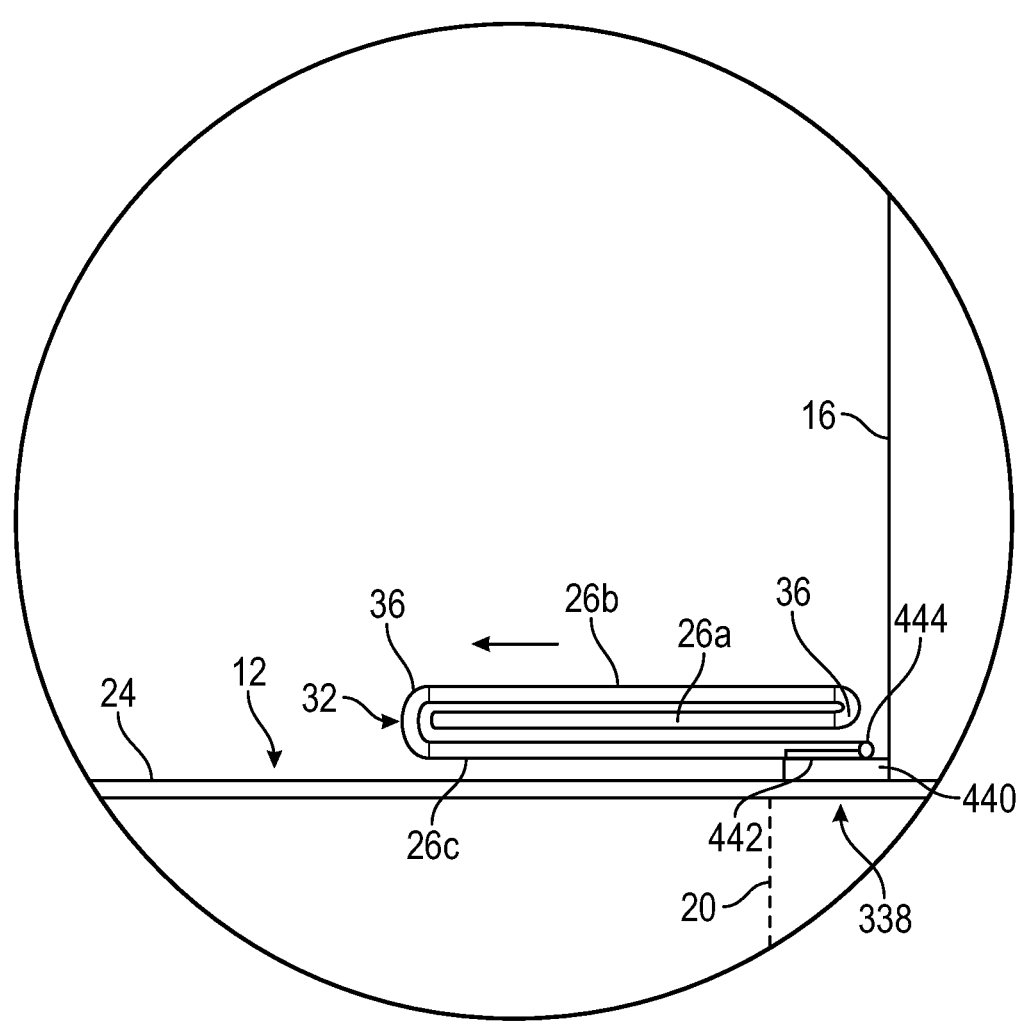
FIG. 7A is an enlarged side view of a folded tonneau cover mounted to the pivot plate seen in FIG. 6.
Figure 7B:
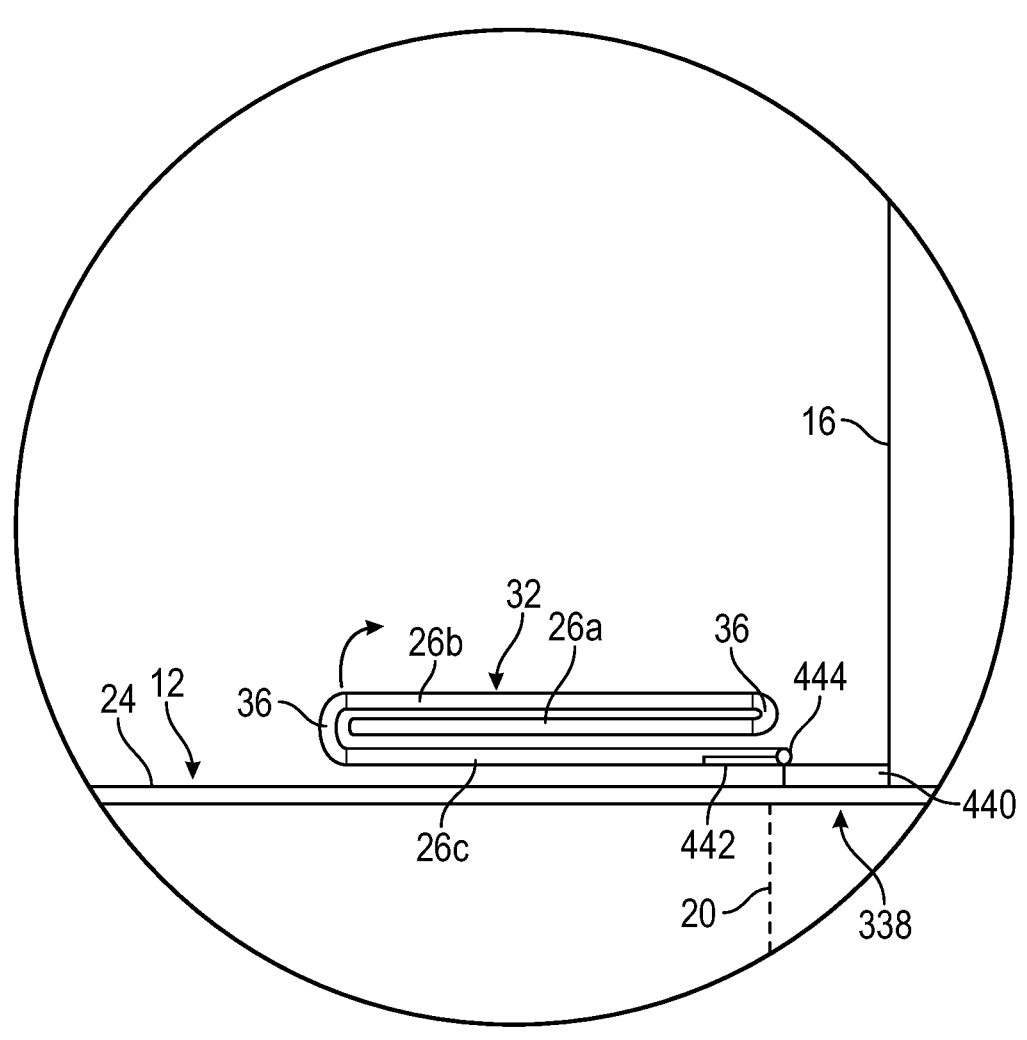
FIG. 7B is an enlarged side view of the folded tonneau cover and pivot plate seen in FIG. 7A and showing the folded tonneau cover shifted away from the cab of the truck.
Figure 7C:
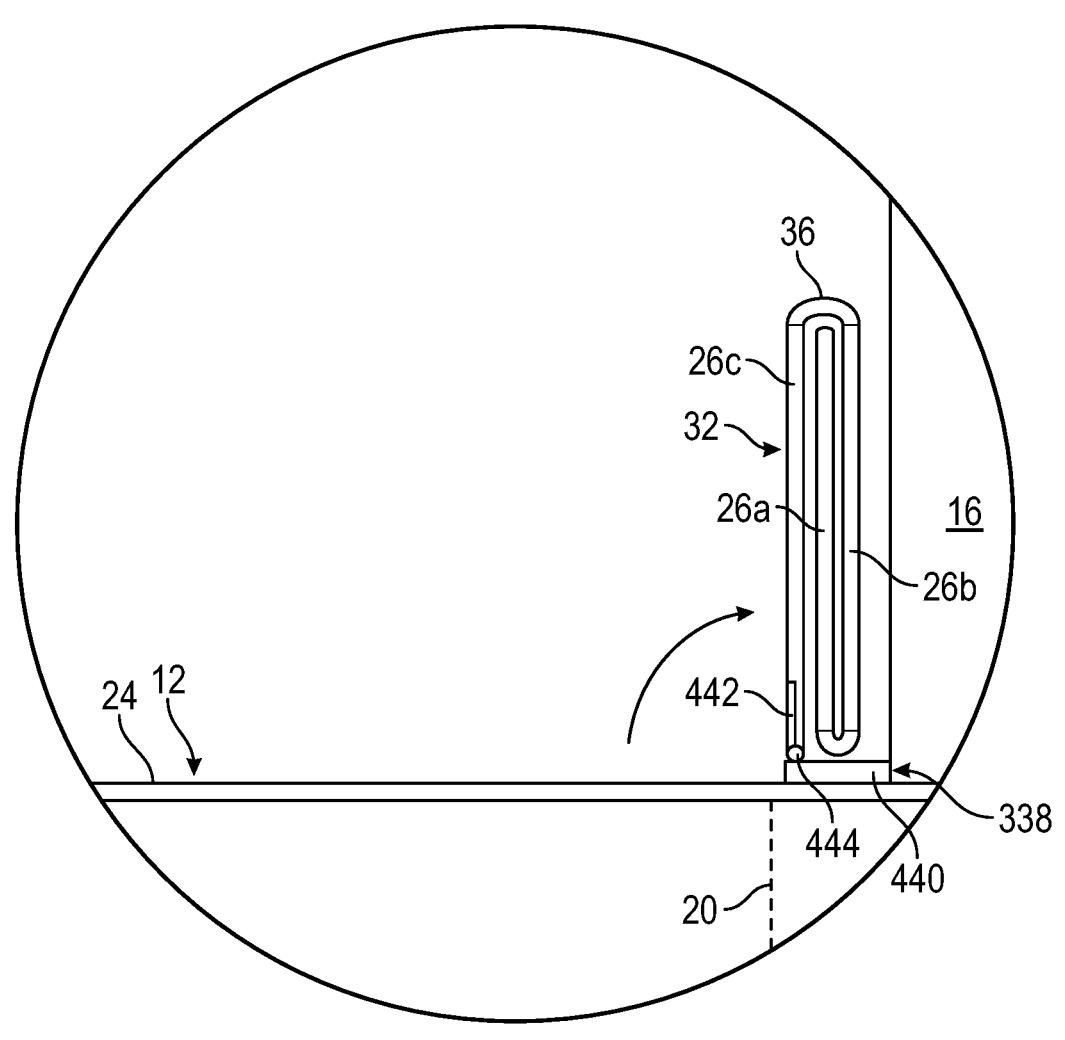
FIG. 7C is an enlarged side view of the folded tonneau cover and pivot plate seen in FIG. 7B and showing the folded tonneau cover subsequently moved into a substantially upright or vertical position.

FIGS. 7A-7C depict an exemplary mechanism of the pivot plate 338 of FIG. 6. The pivot plate 338 includes a fixed plate 440, mountable to the bulkhead 20 as discussed above, and a moveable plate 442, mountable to the front section 26c of the tonneau cover 10. The pivot plate 338 also includes hinge mechanism 444, which as seen in FIG. 7A, is located immediately adjacent to the cab 16. Positioned as such, when the stack 32 is rotated toward the substantially upright or vertical orientation, the stack 32 would contact the cab 16 and be prevented from rotating into the substantially upright or vertical orientation.

The pivot plate 338, however, is configured to allow the folded tonneau cover stack 32 to be moved from a retracted position (seen in FIG. 7A) to an advanced position (seen in FIG. 7B) where the stack 32 is spaced from the cab 16 a distance that is sufficient for the stack 32 to be rotated into the substantially upright or vertical orientation. The shifting of the stack 32 is achieved by enabling the moveable plate 442 and hinge mechanism 444 to slide relative to the fixed plate 440 so that the stack 32 is shifted from the retracted to the advanced position. To achieve the sliding movement, portions of the hinge mechanism 444 may engage the fixed plate 440 in a slot or channel defined in the fixed plate 440 and extending toward the rear of the bed 12, with the portions of the hinge mechanism 440 being moveable along the length of the slot or channel toward the rear of the bed 12, while also be retrained from upward movement out of the slot or channel. Another possible mechanism is for the moveable plate 442 to telescopically receive a separate plate (not shown) positioned on the fixed plate 440, such that the moveable plate 442 can slidably extend along such separate plate into the advanced position. Regardless of how the moveable plate 442 can transition from the retracted position to the advanced position, in the advanced position, the stack 32 may be rotated into the substantially upright or vertical orientation as seen in FIG. 7C.

It will be appreciated that the ability of a pivot plate as disclosed in FIGS. 7A-7C to allow for movement of the tonneau cover stack 32 from a retracted position to the advanced position is not exclusive to a pivot plate mounted on the bulkhead 20 of the bed 12. The pivot plates 38, 238, and 338 shown in FIGS. 4, 5, and 6 may similarly be provided, which would obviates the need for the dead panel 39 used with the pivot plate 38 in FIG. 4.

Although the invention has been described with reference to certain specific embodiments incorporating the principles of the invention, one skilled in the art will readily appreciate that the invention is susceptible to modification, variation and change without departing from the true spirit and fair scope of the invention.

I claim:

1. A pivot plate system that mounts between a tonneau cover and a bed of a pickup truck and enables pivoting of the tonneau cover from a substantially horizontal orientation to a substantially vertical orientation, the pivot plate system comprising:

a first pivot plate configured to mount to or on a first sidewall of the pickup truck;

a second pivot plate configured to mount to or on a second sidewall of the pickup truck, wherein each of the first and second pivot plates comprises:

a fixed plate configured to mount to or on one of the sidewalls of the pickup truck; and a moveable plate configured for releasable direct mounting of a bottom surface of a forward section of the tonneau cover thereto, the moveable plate being pivotally connected to the fixed plate at a forward part thereof and being moveable relative to the fixed plate about an axis between the substantially horizontal orientation and the substantially vertical orientation, such that the tonneau cover is moveable with the moveable plate from the substantially horizontal orientation to the substantially vertical orientation adjacent to a cab of the pickup truck, wherein the tonneau cover is removable from the pivot plate system with the pivot plate system remaining disposed on and secured to the first and second sidewalls of the pickup truck.

2. The pivot plate system of claim 1, wherein the each pivot plate has a top surface configured to be substantially aligned with a top surface of the first and second sidewalls.

3. The pivot plate system of claim 1, further comprising a hinge between the fixed plate and the moveable plate.

4. The pivot plate system of claim 1, further comprising a dead panel extending between the first and second sidewalls and mounted to the bed of the pickup truck forward of the first and second pivot plates.

5. A pivot plate system that mounts between a tonneau cover and a bed of a pickup truck and enables pivoting of the tonneau cover from a substantially horizontal orientation to a substantially vertical orientation, the pivot plate system comprising:

a U-shaped pivot plate disposed both on at least a portion of sidewalls of the pickup truck and on at least a portion of a bulkhead of the pickup truck, the U-shaped pivot plate comprising:

a fixed member configured to mount both on the sidewalls and on the bulkhead of the pickup truck; and a moveable plate configured for releasable mounting of a forward section of the tonneau cover thereto, the moveable plate being pivotally connected to the fixed plate at a forward part thereof and being moveable relative to the fixed plate about an axis between the substantially horizontal orientation and the substantially vertical orientation, such that the tonneau cover is moveable with the moveable plate from the substantially horizontal orientation to the substantially vertical orientation adjacent to a cab of the pickup truck.

6. The pivot plate system of claim 5, wherein the pivot plate has a top surface configured to be substantially aligned with a top surface of the sidewalls and the bulkhead.

7. The pivot plate system of claim 5, further comprising a hinge between the fixed plate and the moveable plate.

8. The pivot plate system of claim 5, further comprising a dead panel extending between the sidewalls of the pickup truck and mounted to the bed of the pickup truck forward of the pivot plate.

9. A pivot plate system that mounts between a tonneau cover and a bed of a pickup truck and enables pivoting of the tonneau cover from a substantially horizontal orientation to a substantially vertical orientation, the pivot plate system comprising:

a first pivot plate configured to mount to or on a bulkhead of the pickup truck;

a second pivot plate configured to mount to or on the bulkhead of the pickup truck, wherein each of the first and second pivot plates comprises:

a fixed member configured to mount to or on the bulkhead of the pickup truck; and a moveable plate configured for releasable mounting of a forward section of a tonneau cover thereto, the moveable plate being pivotally connected to the fixed plate at a rear part thereof when folded and being moveable relative to the fixed plate about an axis between the substantially horizontal orientation and the substantially vertical orientation, such that the tonneau cover is moveable with the moveable plate from the substantially horizontal orientation to the substantially vertical orientation adjacent to a cab of the pickup truck.

10. The pivot plate system of claim 9, wherein in the substantially vertical orientation, the tonneau cover is supported by the fixed member.

11. The pivot plate system of claim 9, wherein each pivot plate has a top surface configured to be substantially aligned with a top surface of the bulkhead.

12. The pivot plate system of claim 9, further comprising a hinge between the fixed plate and the moveable plate.

13. The pivot plate system of claim 12, wherein the first and second pivot plates have a retracted position, where the hinge is configured to be positioned adjacent to the cab of the pickup truck, and an advanced position, where the hinge and movable plate are rearwardly slidable relative to the fixed member.

14. The pivot plate system of claim 9, further comprising a dead panel extending between the first and second sidewalls and mounted to the bed of the pickup truck forward of the first and second pivot plates.

15. The pivot plate system of claim 9, wherein the first and second pivot plates are integrally connected via a central portion that also includes a fixed member and a moveable member that pivots with the movable members of the first and second pivot plates.

\* \* \* \* \*